United States Patent
Brown et al.

(10) Patent No.: US 7,112,796 B2
(45) Date of Patent: Sep. 26, 2006

(54) SYSTEM AND METHOD FOR OPTICAL MONITORING OF A COMBUSTION FLAME

(75) Inventors: Dale M Brown, Schenectady, NY (US); Peter M Sandvik, Guilderland, NY (US); Jeffrey B Fedison, Niskayuna, NY (US); Kevin S Matocha, Rexford, NY (US); Thomas E Johnson, Greer, SC (US)

(73) Assignee: General Electric Company, Niskayuna, NY (US)

( * ) Notice: Subject to any disclaimer, the term of this patent is extended or adjusted under 35 U.S.C. 154(b) by 325 days.

(21) Appl. No.: 10/701,472

(22) Filed: Nov. 6, 2003

(65) Prior Publication Data
US 2004/0089810 A1 May 13, 2004

Related U.S. Application Data

(63) Continuation-in-part of application No. 09/793,432, filed on Feb. 27, 2001, now Pat. No. 6,646,265, which is a continuation-in-part of application No. 09/246,861, filed on Feb. 8, 1999, now Pat. No. 6,239,434.

(51) Int. Cl.
*G01J 5/30* (2006.01)
(52) U.S. Cl. .............................. 250/339.15; 250/339.08
(58) Field of Classification Search ........... 250/339.15, 250/339.08, 339.13; 356/417; 431/79; 60/39.06
See application file for complete search history.

(56) References Cited

U.S. PATENT DOCUMENTS

| | | |
|---|---|---|
| 3,720,495 A | 3/1973 | Zink et al. |
| 3,904,349 A | 9/1975 | Peterson et al. |
| 4,043,742 A | 8/1977 | Egan et al. |
| 4,394,575 A | 7/1983 | Nelson |
| 4,653,998 A | 3/1987 | Sohma et al. |
| 4,887,574 A | 12/1989 | Kuroiwa |
| 4,930,478 A | 6/1990 | Plee et al. |
| 4,934,926 A | 6/1990 | Yamazaki et al. |
| 4,940,033 A | 7/1990 | Plee et al. |
| 5,024,055 A | 6/1991 | Sato et al. |
| 5,037,291 A | 8/1991 | Clark |
| 5,067,463 A | 11/1991 | Remboski et al. |
| 5,071,106 A | 12/1991 | Helkenberg |
| 5,113,828 A | 5/1992 | Remboski et al. |
| 5,125,381 A | 6/1992 | Nutton et al. |

(Continued)

OTHER PUBLICATIONS

Neil Goldstein, Steven Adler-Golden, Xuemin Jin, Jamine Lee, Steven Richtsmeier, Carlos A. Arana; "*Temperature and Temperature Profile Measurements in the Combustor Flowpath Using Structured Emission Thermography*"; Proceedings of ASME/IGTI Turbo Expo 2003, Power for Land, Sea, and Air; Jun. 16-19, 2003, Atlanta, Georgia, USA.

*Primary Examiner*—Otilia Gabor
(74) *Attorney, Agent, or Firm*—Ann M. Agosti; Patrick K. Patnode

(57) ABSTRACT

An optical spectrometer for combustion flame temperature determination includes at least two photodetectors positioned for receiving light from a combustion flame, each of the at least two photodetectors having a different, overlapping bandwidth for detecting a respective output signal in an ultraviolet emission band; and a computer for subtracting a respective output signal of a first one of the at least two photodetectors from a respective output signal of a second one of the at least two photodetectors to obtain a segment signal, and using the segment signal to determine the combustion flame temperature.

26 Claims, 10 Drawing Sheets

U.S. PATENT DOCUMENTS

| | | | |
|---|---|---|---|
| 5,125,739 A | | 6/1992 | Suarez-Gonzalez et al. |
| 5,186,146 A | | 2/1993 | Sohma et al. |
| 5,222,887 A | | 6/1993 | Zabielski |
| 5,249,954 A | | 10/1993 | Allen et al. |
| 5,257,496 A | | 11/1993 | Brown et al. |
| 5,303,684 A | | 4/1994 | Brown et al. |
| 5,394,005 A | | 2/1995 | Brown et al. |
| 5,467,185 A | | 11/1995 | Engeler et al. |
| 5,473,162 A | * | 12/1995 | Busch et al. ............. 250/341.6 |
| 5,480,298 A | | 1/1996 | Brown |
| 5,487,266 A | * | 1/1996 | Brown ........................ 60/776 |
| 5,544,478 A | | 8/1996 | Shu et al. |
| 5,589,682 A | | 12/1996 | Brown et al. |
| 5,708,507 A | * | 1/1998 | Wright et al. ............... 356/417 |
| 5,755,819 A | | 5/1998 | Bonanni et al. |
| 5,834,331 A | | 11/1998 | Razeghi |
| 5,979,423 A | | 11/1999 | Poindexter et al. |
| 6,045,353 A | * | 4/2000 | VonDrasek et al. ........... 431/79 |
| 6,104,074 A | | 8/2000 | Chen |
| 6,109,783 A | | 8/2000 | Dobler et al. |
| 6,135,760 A | * | 10/2000 | Cusack et al. ................ 431/79 |
| 6,142,665 A | | 11/2000 | Haffner et al. |
| 6,239,434 B1 | | 5/2001 | Brown |
| 6,244,857 B1 | | 6/2001 | VonDrasek et al. |
| 6,261,086 B1 | | 7/2001 | Fu |
| 6,278,374 B1 | | 8/2001 | Ganeshan |
| 6,318,891 B1 | | 11/2001 | Haffner et al. |
| 6,350,988 B1 | | 2/2002 | Brown |

* cited by examiner

SYSTEM AND METHOD FOR OPTICAL MONITORING OF A COMBUSTION FLAME

CROSS REFERENCE TO RELATED APPLICATIONS

This Application is a Continuation-In-Part of commonly assigned Brown, U.S. application Ser. No. 09/793,432, filed Feb. 27, 2001 now U.S. Pat. No. 6,646,265, which is a Continuation-In-Part of commonly assigned Brown, U.S. application Ser. No. 09/246,861, now U.S. Pat. No. 6,239,434, filed Feb. 8, 1999, each of which are incorporated by reference herein.

STATEMENT REGARDING FEDERALLY SPONSORED RESEARCH & DEVELOPMENT

This invention was made with Government support under U.S. Department of Energy contract number DEFC2601NT41021. The Government has certain rights in the invention.

BACKGROUND OF THE INVENTION

The invention relates generally to optical flame detection.

Flame temperature sensors are needed for control ling a wide range of combustion processes. Some combustion processes that require tight control of fuel-to-air ratios for increased fuel burning efficiency and reductions in emission pollution are present in, for example, building heating systems, jet aircrafts, locomotives, and fossil fueled electric power plants and other environments wherein gas and/or steam turbines are used.

Unnecessarily high combustion temperatures can compromise fuel efficiency and increase emission pollution. For example, in a gas turbine designed to emit nine nitrogen oxide (NOx) particles per million (ppm), an increase from 2730° F. (1499° C.) to 2740° F. (1504° C.) reduces turbine efficiency by about two percent and increases NOx emissions by about two ppm.

Previous silicon carbide flame detectors such as described in Brown et al., U.S. Pat. No. 5,589,682, issued Dec. 31, 1996, detect the presence of a flame and measure the intensity of the flame's photon flux over a wide range of wavelengths. The measured intensity, however, does not always correlate to flame temperature, because intensity is a function of the number of emitting molecules or the amount of fuel being consumed. A ratio of two signals is required to cancel the intensity or fuel factor.

In commonly assigned, Brown, U.S. application Ser. No. 09/561,885, filed May 1, 2000, a continuation-in-part of aforementioned Brown, U.S. Pat. No. 6,239,434, an optical spectrometer for combustion flame temperature determination includes at least two photodetectors positioned for receiving light from a combustion flame and having different overlapping optical bandwidths for producing respective output signals; and a computer for obtaining a difference between a first respective output signal of a first one of the at least two photodetectors with respect to a second respective output signal of a second one of the at least two photodetectors, dividing the difference by one of the first and second respective output signals to obtain a normalized output signal, and using the normalized output signal to determine the combustion flame temperature.

Although the method and system described above provide enhanced flame temperature measurement over conventional methods, disadvantages exist regarding the complexity and cost of multiple photodetector systems. Accordingly, there remains a need in the art of optical flame temperature measurement for a system which provides accurate measurements in a more efficient manner.

BRIEF SUMMARY OF THE INVENTION

It is therefore seen to be desirable to have a more direct temperature determination technique.

Briefly, in accordance with one embodiment of the present invention, at least two photodetectors are positioned for receiving light from a combustion flame, each of the at least two photodetectors having a different, overlapping bandwidth for detecting a respective output signal in an ultraviolet emission band. A computer then calculates a ratio of integrated intensities for each of the different overlapping bandwidths, and uses the ratio of integrated intensities to determine a temperature of the combustion flame temperature.

In accordance with another embodiment of the present invention, a multiple element CCD-based spectrophotometer receives light from the combustion flame, wherein the multiple element CCD-based spectrophotometer operates to monitor an optical emission spectrum in at least first and second discrete bandwidth ranges and generates a first intensity signal representative of the flame intensity in the first bandwidth range and a second intensity signal representative of the flame intensity in the second bandwidth range. A computer integrates the first intensity signal to generate a first integrated intensity, integrates the second intensity signal to generate a second integrated intensity, calculates a ratio of integrated intensities of the first and second integrated intensities, and then uses the ratio to determine a temperature of the combustion flame.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTION

Figure 1:
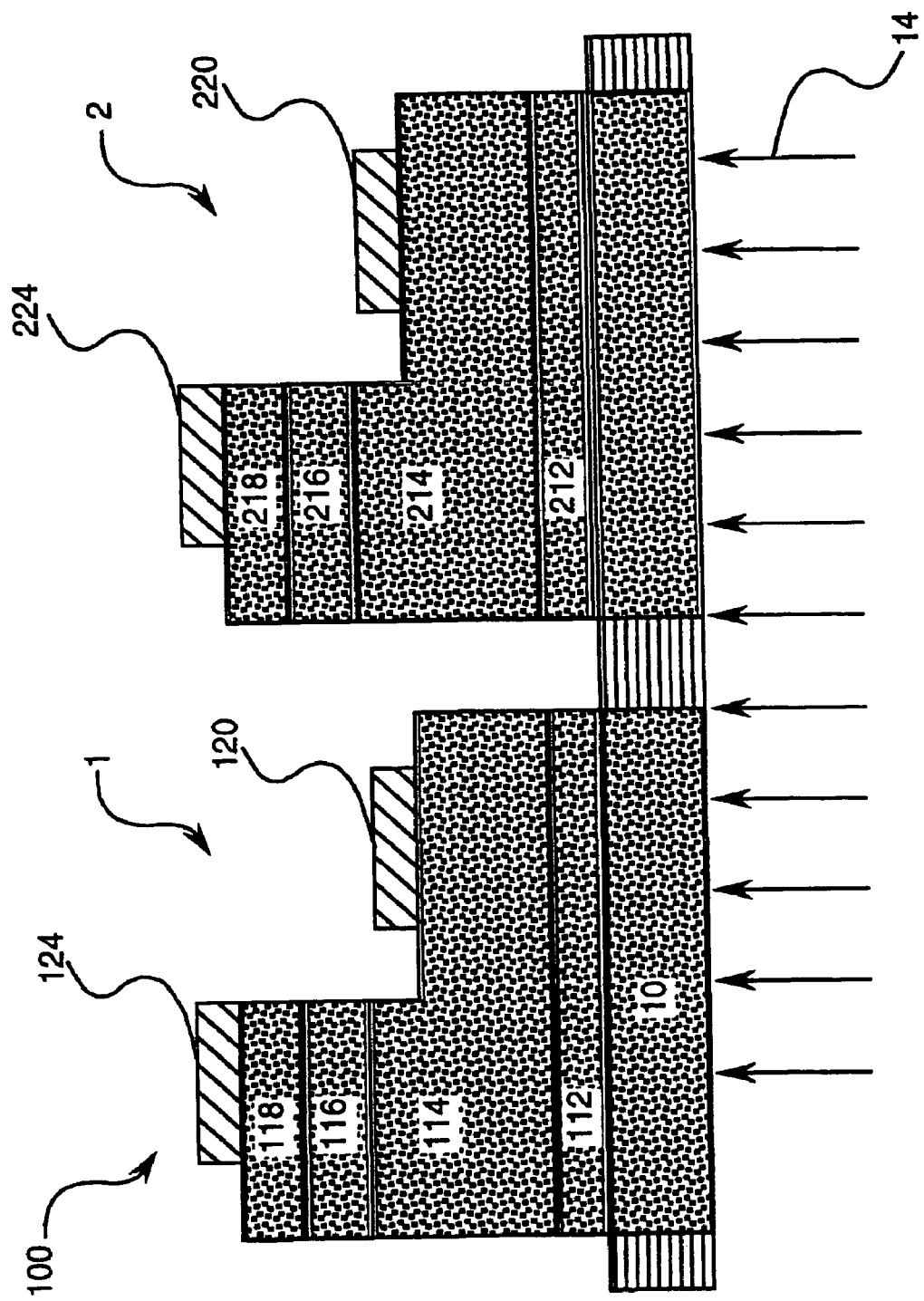
FIGS. 1 and 2 are sectional side and top views respectively of photodetectors used in accordance with one embodiment of the present invention.
Figure 2:
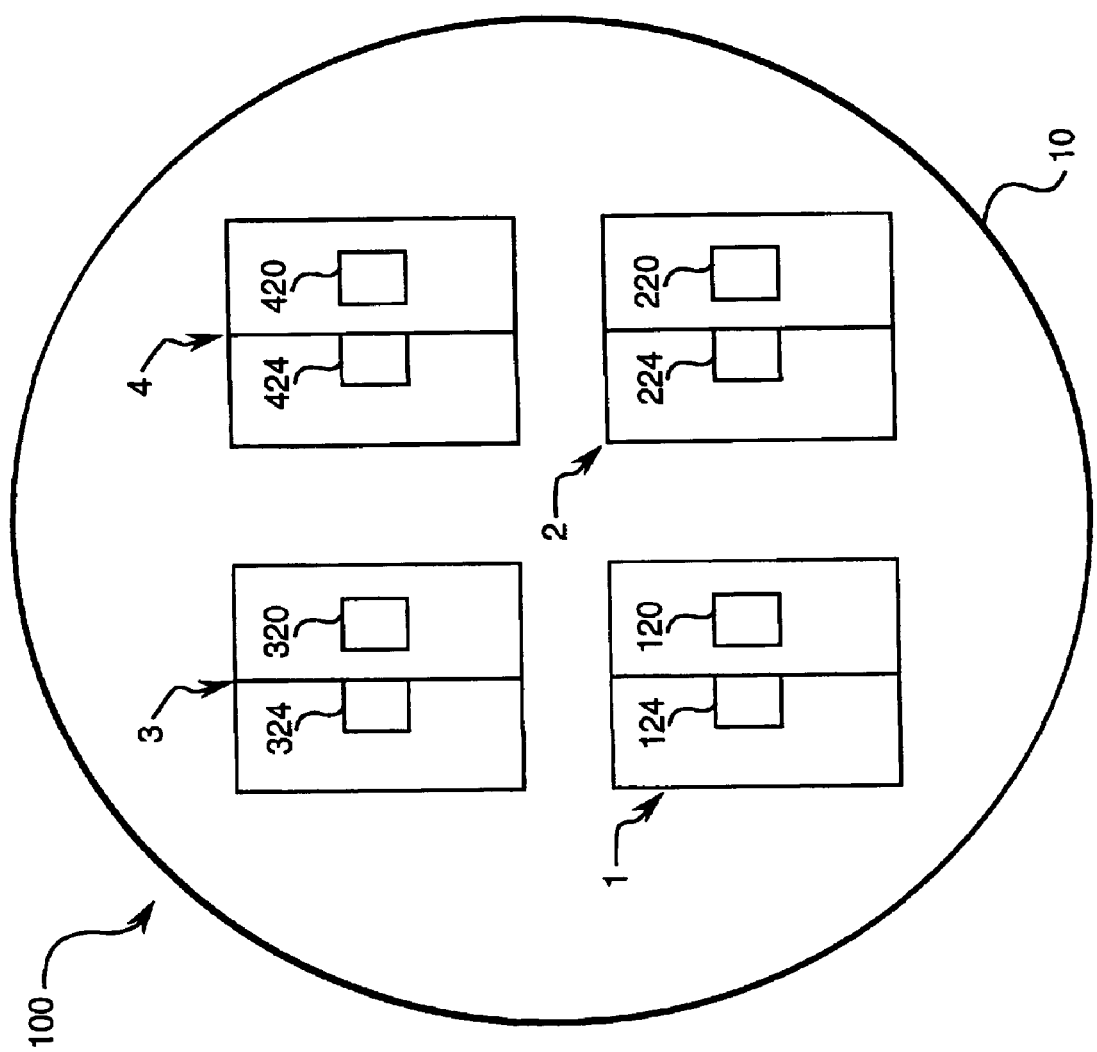
Figure 3:
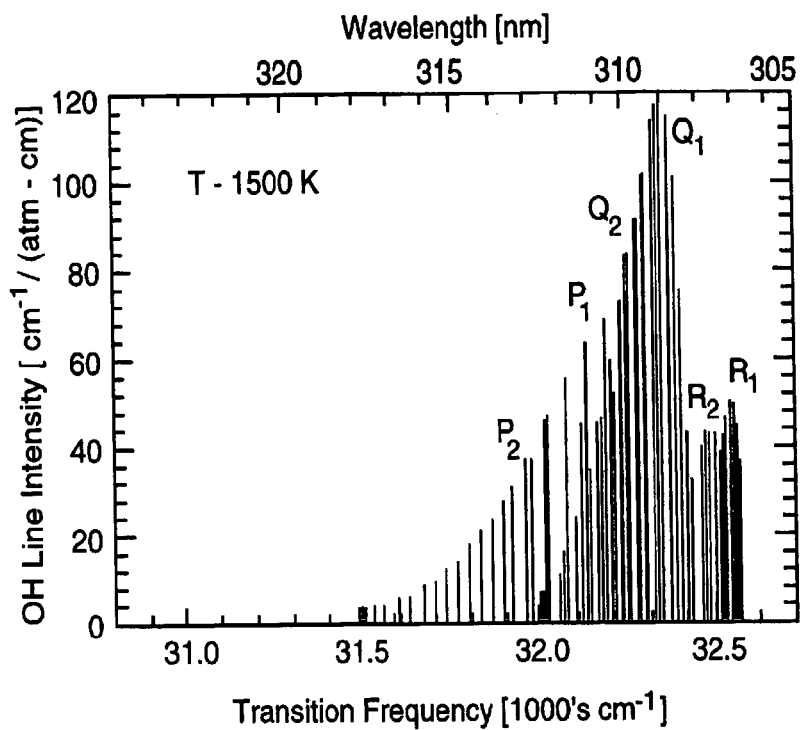
FIGS. 3–6 are graphs illustrating line intensity and distribution of an OH emission at four temperatures.
Figure 4:
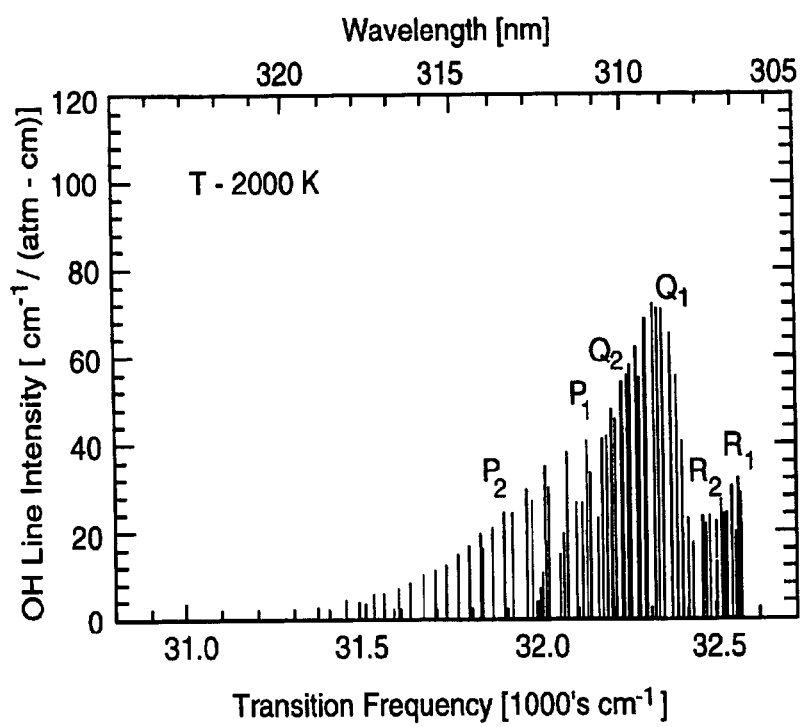
Figure 5:
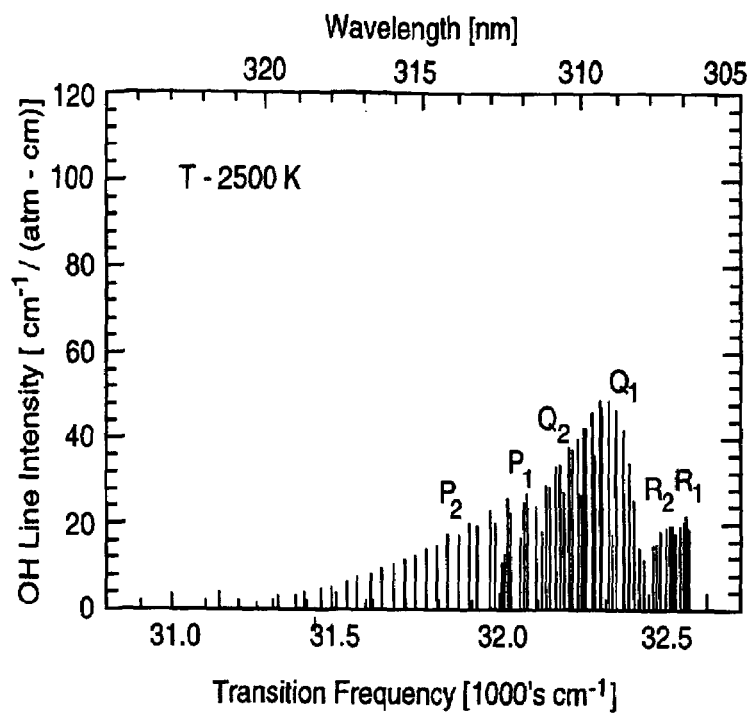
Figure 6:
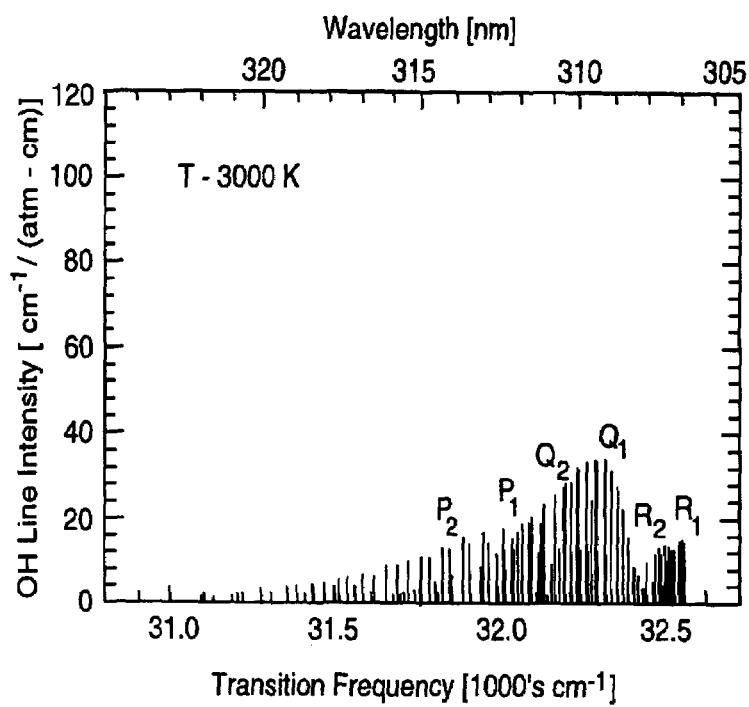

In accordance with one embodiment of the present invention, FIGS. 1 and 2 are sectional side and top views respectively of an optical spectrometer 100 for combustion flame temperature determination. Spectrometer 100 includes at least two photodetectors (shown for purposes of example as four photodetectors 1, 2, 3, 4) positioned for receiving light 14 from a combustion flame, each of the at least two photodetectors having a different bandwidth for detecting a respective output signal within the OH emission band and a computer 34 (shown in FIG. 8) for subtracting a respective output signal of a first one of the at least two photodetectors from a respective output signal of a second one of the at least two photodetectors to obtain a segment signal, and using the segment signal to determine the combustion flame temperature.

The OH emission band for wavelengths in the 310 nanometer (nm) range includes a series of fine emission lines which are produced by various transitions between energy levels of the OH molecule. Both rotational and vibrational transitions occur. The OH molecules in combustion flames have emission characteristics which reflect the combustion flame temperature. The intensity and distribution of these lines in the OH emission band in the 310 nm range is shown for four temperatures in FIGS. 3–6. The temperatures between 1500 degrees Kelvin and 3000 degrees Kelvin are typical flame temperatures for a gas turbine combustor.

Gallium nitride (GaN, Eg=3.4 eV) has a maximum wave length of absorption of about 365 nanometers. That is, GaN is transparent for wavelengths longer than 365 nanometers. Aluminum nitride (AlN, Eg=6.2) has a maximum wave length of absorption of about 200 nanometers. A class of alloys of GaN and AlN designated Al are direct bandgap materials with bandgaps variable between the two extremes of GaN and AlN depending on the amount of aluminum in the alloy. The semiconductors of these alloys have optical transitions directly from valance band to conduction band and do not require phonon assistance for transitions (as compared with silicon carbide where such assistance is required). The cutoff in responsivity is therefore sharp and thus provides for high resolution. Although a specific embodiment of the invention is discussed in terms of Al other alloys can be used with direct bandgap alloys being particularly useful.

An array of photodetectors 1–4 (FIGS. 1 and 2) can be used to detect the flame intensity (light 14) in different segments of the OH emission band. The photodetectors may comprise photodiodes or phototransistors, for example. In a preferred embodiment, each photodetector includes alloys which have different bandgaps so as to produce a substantially similar minimum wavelength of optical responsivity and a different maximum wavelength of optical responsivity.

Figure 7:
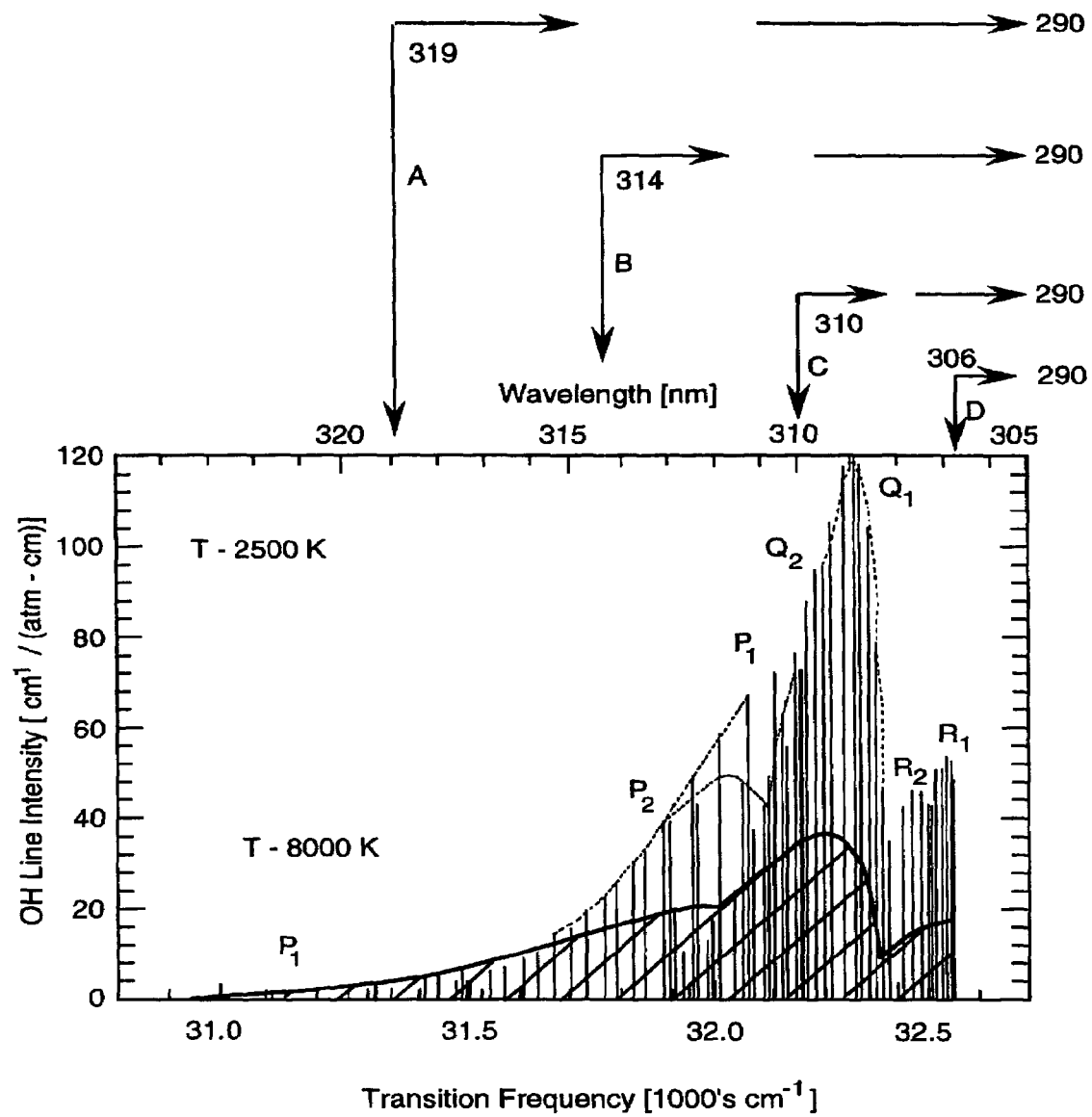
FIG. 7 is a graph illustrating an example of how regions of the OH band could be subdivided in order to obtain multiple ratios using these segments.

For example, with respect to FIG. 1, each of two photodetectors 1 and 2 is positioned on a substrate 10 comprising a substantially transparent material which can withstand the combustion environment. One such material, for example, is sapphire having a thickness ranging from about 125 micrometers to about 750 micrometers. A first n type semiconductor layer 114, 214 includes aluminum gallium nitride and has a thickness ranging from about 0.5 micrometers to about 5 micrometers. If the combination of elements results in an alloy of $Al_{0.35}Ga_{0.65}N$, a maximum wavelength of absorption of the first semiconductor layer (and thus a minimum wavelength of optical responsivity of photodetector 1, 2) is established at about 290 nanometers. That is, the alloy will be substantially transparent to wavelengths above 290 nanometers and absorb wave lengths below 290 nanometers. Second lightly doped p or n type semiconductor layers 116, 216, in this embodiment, comprise aluminum gallium nitride with different compositions of aluminum providing varying maximum wave lengths of optical responsivity of the photodetectors and a thickness ranging from about 0.2 micrometers to about 1 micrometer. In the embodiment of FIG. 7, the maximum wavelengths of optical responsivity vary from 319 nanometers, 314 nanometers, 310 nanometers, and 306 nanometers. Optional third p type semiconductor layer 118,218 may then he supported by second semiconductor layer 116,216 and comprise gallium nitride. In the embodiment of FIG. 1, a first contact pad 120, 220 is supported by first semiconductor layer 114, 214, and a second contact pad 124, 224 is supported by first, second, and third semiconductor layers. The first and second contact pads in one embodiment comprise a metal, an alloy, or layers of metals or alloys including materials such as titanium, nickel, aluminum, or gold, for example, having a thickness ranging from about 1000 angstroms to about 5000 angstroms. Additionally, a buffer layer 112, 212 of aluminum nitride may be present between the first semiconductor layer and the substrate. In one embodiment, the buffer layer has a thickness ranging from about 0.2 micrometers to about 1 micrometer. Alternatively, a filter may also be positioned in place of one of the buffer layers 112, 212. The filter is used to remove wavelengths which are shorter than the desired minimum wavelength.

In another embodiment of the present invention photodetector 1 includes a first n type semiconductor layer 114 consisting of AlGaN, while the first n type semiconductor layer 214 of photodetector 2 consists of GaN. In this manner, a ratio may be formed of the long wavelength region integrated intensity divided by the integrated intensity of the whole band, such that:

$$R(T) = \frac{I(GaN) - I(AlGaN)}{I(GaN)} = 1 - \frac{I(AlGaN)}{I(GaN)}$$

Although four photodetectors 1–4 are shown in FIG. 2, as few as two photodetectors 1–2 can be used in accordance with this embodiment of the present invention, and there is no maximum number of photodetectors. Additional photodetectors may provide more accurate results at the expense of equipment and complexity of calculations.

Additionally, although it is preferred that each of the at least two photodetectors in the present embodiment have a substantially similar minimum wavelength of optical responsivity, in the event that one or more photodetectors has a different minimum wavelength of optical responsivity, one or more filters 12 (shown in FIG. 8) can be used to remove wavelengths which are shorter than the desired minimum wavelength of optical responsivity so that output signals used for temperature determination have substantially similar minimum wavelengths of optical responsivity. Filter 12 preferably comprises an optical filter and in one embodiment is situated between substrate 10 and photodetectors 1, 2, 3, 4.

In an alternative embodiment of the present invention, a multiple layer dielectric filter 12 is used to determine the short wavelength cutoff of at least one of the photodiodes. In one implementations, such a filter may be comprised of alternating layers of $HfO_2$ and $SiO_2$. The presence of such a filter on one of the two SiC photodiodes would facilitate formation of a signal resulting from the integrated intensities of all the emission lines from approximately 312 to 400 nm. Conversely, the unfiltered photodiode would produce a signal representative of the integrated intensities of all the emission lines between 200 and 400 nm. The ratio of these two signals would then be a function of temperature.

Moreover, although the invention is discussed in terms of substantially similar minimum wavelengths of optical responsivity for purposes of illustration, it is not necessary that it is the minimum wavelengths of optical responsivity which are substantially similar. For example, in FIG. 1, the variation in aluminum content can occur in first semiconductor layer 114, 214 rather than in second semiconductor layer 116, 216 such that the maximum wavelengths of optical responsivity are similar and the minimum wave lengths of optical responsivity vary.

Regardless of the precise method of obtaining the output signals, the output signals resulting in the present invention comprise at least two output signals having a different bandwidth with either a substantially similar minimum wavelength of optical responsivity or a substantially similar maximum wavelength of optical responsivity.

By subtracting one of the at least two output signals from the other of the at least two output signals, the intensity of the spectral emission lines between the two maximum wavelengths can be determined. For example, the output signals of the photodetectors are labeled A, B, C, and D on FIG. 7. If output signal B is subtracted from output signal A, the resulting signal intensity in the segment signal in the wavelength range of 314 to 319 nanometers can be compared by computer 34 with a look-up table (which may be generated from integrations of curves such as those in FIGS. 3–6 either in graphical or digital form) to determine the temperature.

In the event that the substrate 10 (or optical window) becomes dirty from the combustion environment, the signal reduction for each band will be proportionally reduced such that the intensity ratio will remain an accurate temperature indicator regardless of the substrate or window conditions and the system will be self-compensating.

As discussed above, accuracy will increase by using additional photodetectors. For example, if three photodetectors and two subtractions are performed (A–B and B–C), then additional data is present to use in the look-up table and obtain the temperature determination. Although it is preferred that the shorter bandwidth output signal be subtracted from the longer bandwidth output signal, such orientation is not critical. Additionally, for accuracy it is preferred that segment signals from "adjacent" output signals such as A–B, B–C, and C–D be evaluated, but non-adjacent segment signals from output signals such as A–C or B–D can also be used.

An even more useful analysis technique, which requires at least three photodetectors is to obtain a ratio of intensities of two segment signals. A ratio, like an intensity, is self-compensating and is additionally useful for eliminating the effects of signal drift caused by variance in a gain of a single signal amplifier.

In this embodiment, the computer subtracts a respective output signal (B) of a first one 1 of a first pair 1, 2 of at least three photodetectors 1, 2, 3 from a respective output signal (A) of a second one 2 the first pair of the at least three photodetectors to obtain a first segment signal, and the computer further subtracts a respective output signal (C) of a first one 3 of a second pair 2, 3 of the at least three photodetectors from a respective output signal (B) of a second one 2 of the second pair of the at least three photodetectors to obtain a second segment signal. In this example, the ratio is then obtained of the intensity of the segment signal resulting from A–B divided by the intensity of the segment signal resulting from B–C. The above example is an illustration of one embodiment, any of a number of different ratios can be used. For example, a ratio of intensities of C–A/B–A can also be used.

The OH emission band for wavelengths in the 310 nanometer (nm) range is useful because in this wavelength region signal intensity is high and little interference results from blackbody radiation for combustor wall (not shown) temperatures as high as 1200° C. Although the OH emission band is preferred, the principles can be applied to other spectral bands or combinations of bands.

After the ratio is obtained, computer 34 can use a lookup table to determine the combustion flame temperature. The temperature lookup table can be based on ratios of integrations of intensities within segments of curves such as shown in FIGS. 3–6. As discussed above, additional data points provide increased accuracy. If the computer obtains a third segment signal from a third pair of photodetectors and uses it to create an additional ratio, that ratio can be used to enhance the accuracy of the temperature determination. The third segment signal can be obtained either from the non adjacent A–C output signals or, more preferably, from a signal D of a fourth photodiode 4 which can provide an segment signal representative of output signals C–D, for example.

Figure 8:
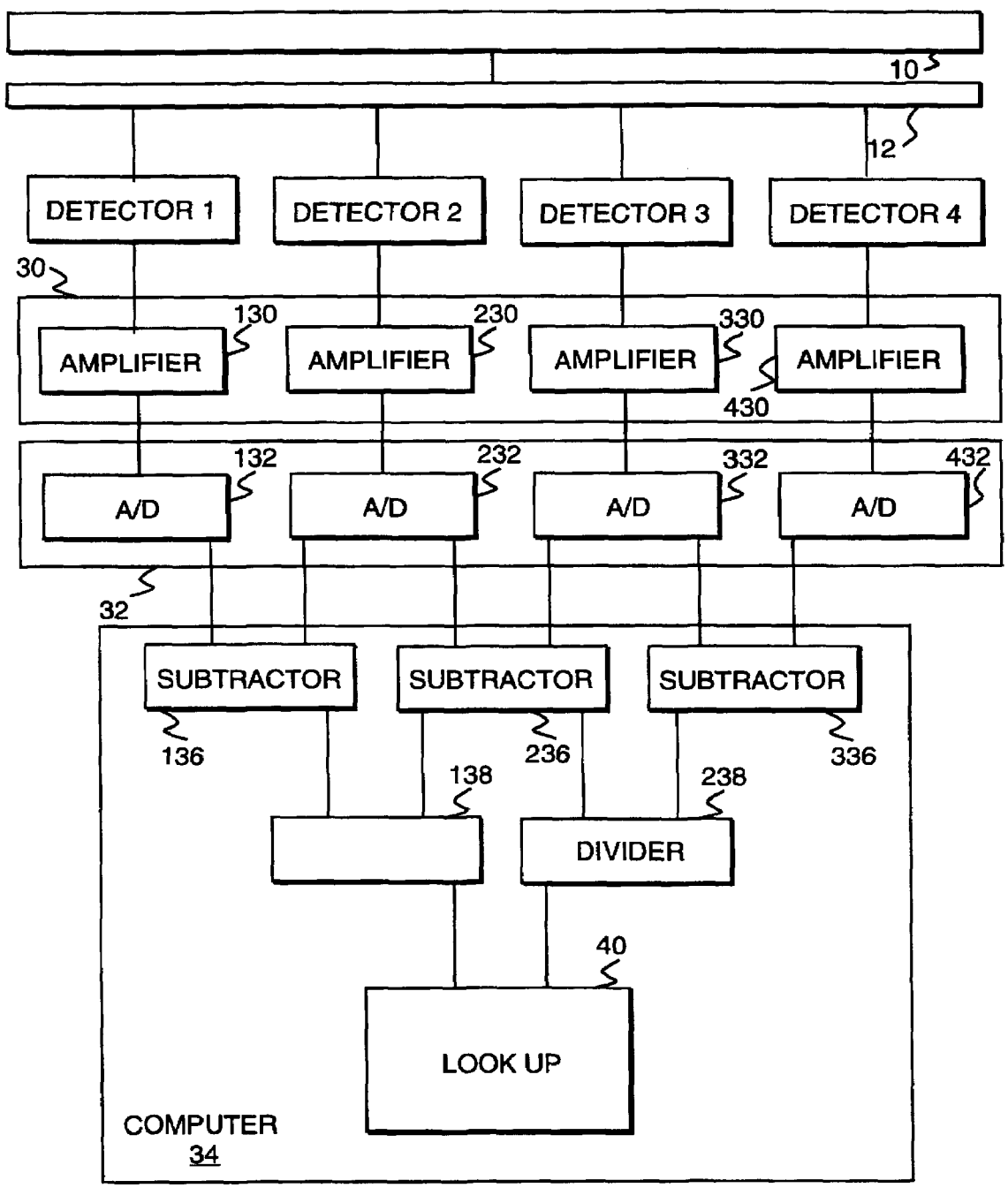
FIG. 8 is a block diagram of a signal processing technique for analyzing the spectrum using the photodetectors of FIGS. 1 and 2 in accordance with an embodiment of the present invention.

FIG. 8 is a block diagram of a technique for analyzing of the photodetectors of FIGS. 1 and 2 in accordance with an embodiment of the present invention illustrating detectors 1–4. If desired, signal amplification can be provided by multiplexing signals from the detectors into one amplifier 30 or by using a number of separate amplifiers 130, 230, 330, 430. Preferably the amplification is performed with an analog operational amplifier.

The signals are then converted by either a single analog to-digital (A/D) converter 32 or by separate A/D converters 132, 232, 332, 432. Then computer 34 can subtract respective resulting output signals to obtain segment signals with subtractors 136, 236,336 and obtain ratios of segment signal intensities with dividers 138, 238 prior to using a look up table 40.

If a multiplexer is used for the amplification and/or the A/D conversion, then the computer will include memory for storing individual output signals prior to subtracting and dividing. It is further useful for the computer to perform long term time averaging of the output signals prior to subtracting so as to reduce effects of noise or flame intensity fluctuations. Such time averaging could occur on the order of seconds, hours or days, for example.

In another embodiment, the system can be designed to sense flame outs or ignitions rapidly. Information as to flame presence and average temperature can be directed on a real time basis to a control system of the computer. Closed loop 15 control can be used to optimize the fuel-to-air ratio for minimizing nitrogen oxide and carbon monoxide emissions produced by combustion.

Figure 9:
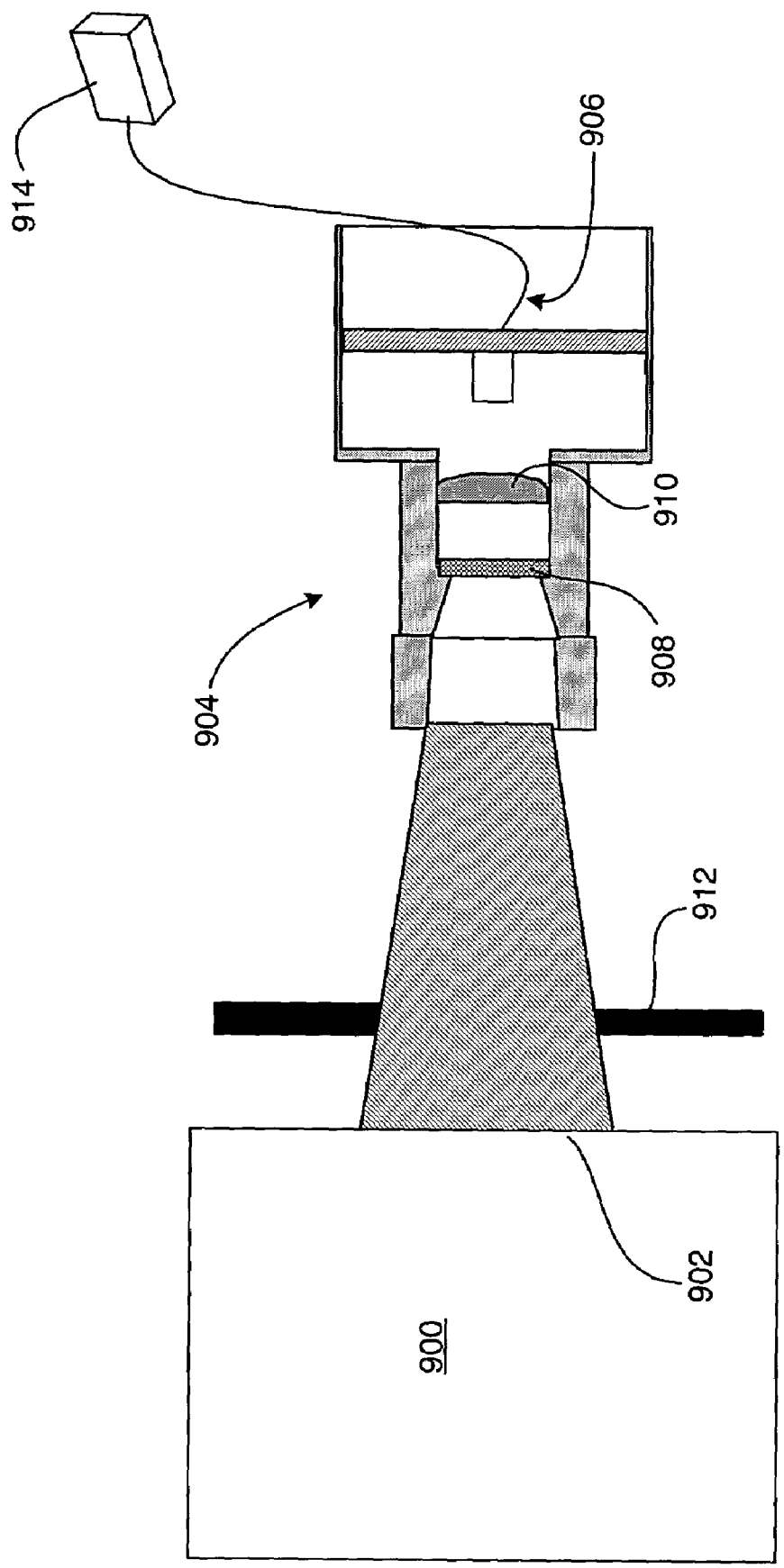
FIG. 9 is a simplified block diagram illustrating an alternative embodiment of the flame temperature detection system of the present invention.

Referring now to FIG. 9, there is shown a simplified block diagram illustrating an alternative embodiment of the flame temperature detection system of the present invention. In particular, a combustion flame cell 900 having a monitoring opening 902 therein houses the combustion flame being monitored. A fiber mount 904 is provided adjacent the monitoring opening 902 and houses a fiber optic element 906 that receives light output from the monitored flame. As is known in the art, fiber optic elements may be manufactured in a variety of lengths and operate to transmit light received on one end to the opposite end, with little or no loss in content.

In addition to the fiber optic element 906, the fiber mount 904 also preferably includes a window substrate 908 comprising a substantially transparent material such as sapphire (as described above) which can withstand the combustion environment. Further, a lens element 910 is provided adjacent the window substrate 908 in the fiber mount 904 for focusing the received light onto the fiber optic element 906. In one embodiment, an adjustable iris 912 or aperture is provided between the monitoring opening 902 and the fiber mount 904 for enabling adjustment of the size of the effective monitoring opening.

In accordance with the present embodiment of the invention, an optical spectrophotometer 914 is provided at the opposite end of the fiber optic element 906 for receiving light output from the monitored flame across a variety of disparate bandwidths. The optical spectrophotometer 914 operates to simultaneously measure the entire emission spectrum of the combustion flame through an array of photodiodes working at various wavelengths. This facilitated various measurements including spectral output vs. position of the flame, as well as spectral output vs. flame temperature. All data presented in the following discussion was taken by integrating the spectrophotometer over 3 seconds and using one average. In one specific embodiment, the spectrophotometer 914 operates to collect data sets in 2048 point arrays (from 179.33 to 868.75 nm), about every 0.4 nm, and has a resolution of 1.5 nm.

One example of a suitable optical spectrophotometer for use with the present embodiment is the SF2000 Miniature Fiber Optic Spectrophotometer manufactured by Ocean Optics, Inc. This device utilizes the fiber optic cable to collect the light and transmit it to a diffraction grating. The dispersed light then impinges on a silicon CCD (charge coupled device) coated with a phosphor to produce electrical outputs as a function of wavelength into the ultra-violet region. Although the resulting resolution is not as high as a very narrow slit spectrometer required to resolve individual spectral lines, its resolution is perfectly adequate to trace the shape of the OH or other ultraviolet band as specified by the present invention. This device utilizes integration times of 1 to 3 seconds and also requires a relatively large photon intensity to produce good signal to noise. In one embodiment, the optical spectrophotometer includes 2048 CCD elements operating to detect incoming light between at least 179 to 868 nm. The distribution of points varies somewhat over this wavelength range. The spectrometer including the fiber optic cable can be calibrated by Ocean Optics over its effective range of 200 to 1100 nm which then gives true relative intensity versus wavelength.

As described in each prior embodiment, the flame temperature determination element of the present embodiment also preferably monitors light emission from OH molecules of a combustion flame, although other molecules may also be monitored. In the present embodiment, the light emission spectrum is measured using the optical spectrophotometer 914, rather than distinct photodiode devices. The OH emission band emits light primarily in the range of 280 to 320 nm. As stated above, it has been found that the distribution of the OH light emission changes with temperature in such a way as to be able to determine the absolute temperature of the flame by monitoring these emissions. Specifically, as temperature changes, the longer wavelengths of the OH emission band change in intensity faster than the shorter wavelengths.

Accordingly, the OH band of the light emission spectrum is monitored and the temperature is determined by taking the ratio of at least two discrete portions of the measured OH band emission spectrum. In one embodiment, the ratio could be the integrated intensity of a long wavelength region which changes rapidly with temperature divided by a short wavelength region which changes only slightly with temperature. Such a computational process may be performed by an attached processor, such as a PC or other suitable device. It should be understood that although the present embodiment discusses only the OH band, the present invention is not limited to such an embodiment and may easily be adapted to monitor other lines such as CO, HCO, CN, CH or NOx based emission or any suitable combination of these bands, which could all conceivably be used for temperature determination by themselves or in conjunction with other elements.

In accordance with an alternative embodiment of the present invention, multiple fiber mounts 904 are simultaneously utilized to monitor combustion flame temperature at several different combustion cells. The output from each associated fiber optic element 906 is then collected together at one spectrophotometer 914. The individual output signals are preferably multiplexed together using optical switching. In this manner, data from multiple combustion cells may be monitored together for determination of potential trends or other combined effects.

EXAMPLE FLAME TEMPERATURE DATA

The following experimental data was generated through a series of experiments in various controlled environments. By changing the fuel flow for various runs, data at various temperatures was obtained. In the present example, tests were performed starting at a high temperature of about 3200° F.; sweeping down to about 2700° F. and then returning to the high point of 3200° F. Temperatures in each test were independently monitored by an conventional $O_2$ temperature probe. The resulting normalized spectrophotometer data for six discrete temperatures is shown in FIG. 10.

Figure 10:
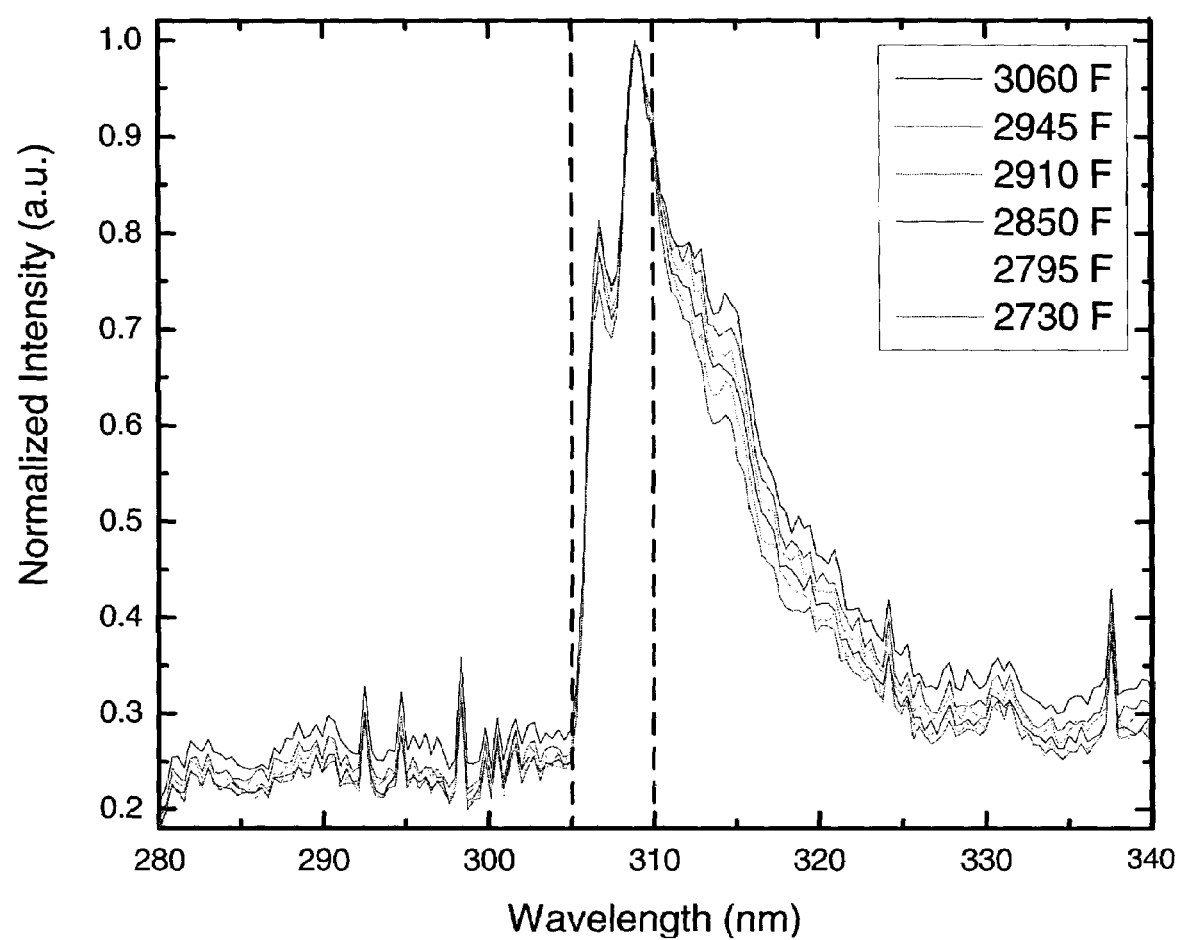
FIG. 10 is a graph illustrating normalized line intensity and spatial distribution of the ultraviolet emission band between 280 and 340 nm at six discrete temperatures.

The graph of FIG. 10 clearly shows a monotonic change in the intensity in the long wavelength region of the OH band between 310 and 340 nm and the very small change in intensity which occurs between 305 and 310 nm. Accordingly, the data from these two wavelength bands were integrated and utilized to obtain the ratio of the present invention. The ratio may be illustrated by the following expression:

$$\text{Ratio} = \frac{\int_{310}^{340} I(\lambda)\,d\lambda}{\int_{305}^{310} I(\lambda)\,d\lambda},$$

where $I(\lambda)$ represents the measured intensity for a wavelength $\lambda$.

Figure 11:
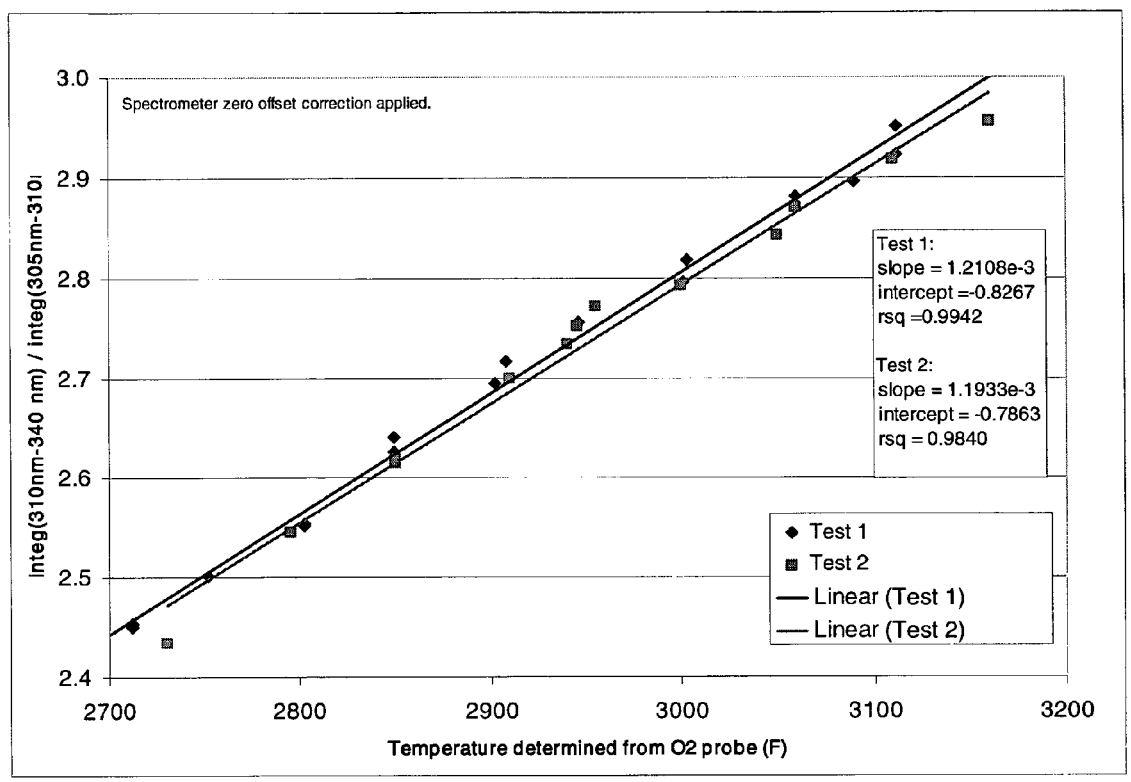
FIG. 11 is a graph of integrated intensity ratio data for two sets of temperature sweeps.
Figure 12:
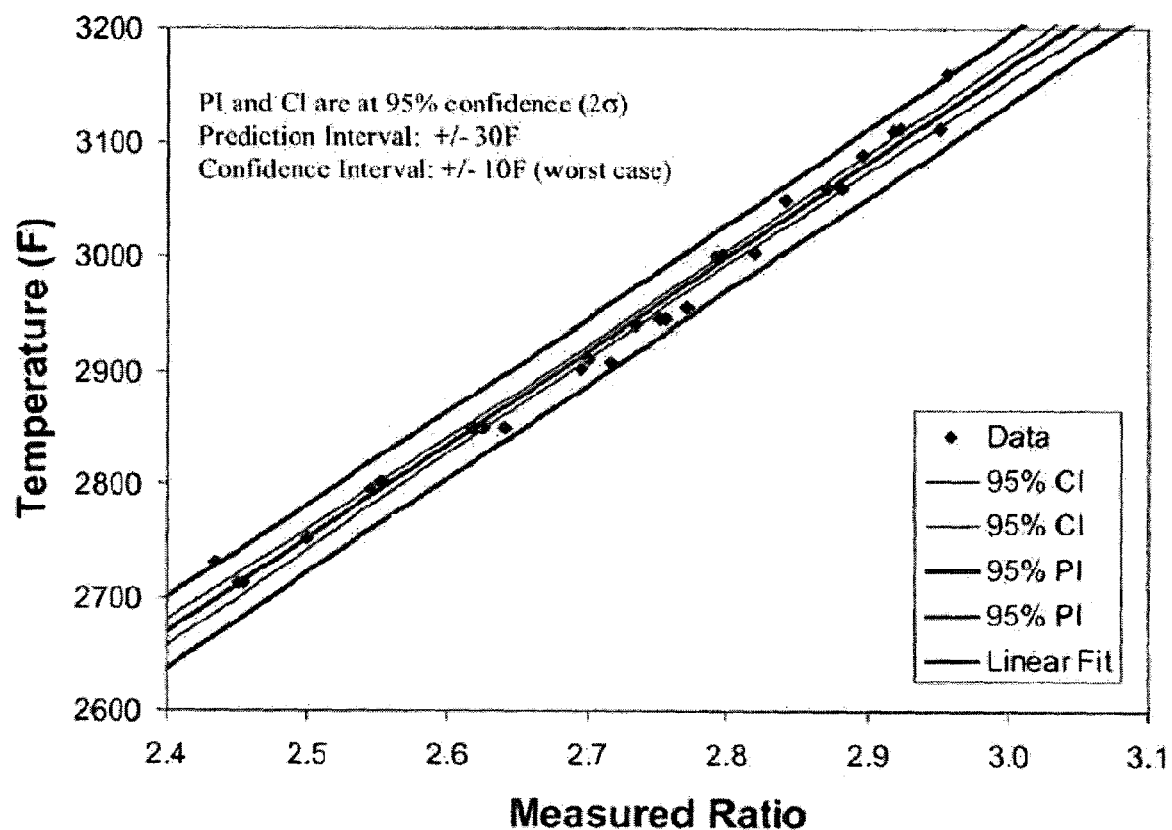
FIG. 12 is a graph of temperature versus measured ratio for the data of FIG. 11.

FIG. 11 illustrates a graph of this intensity ratio data for two sets of temperature sweeps. As stated above, these ratio's were obtained by integrating flame intensity between 310 and 340 nm (ratio's numerator) and flame intensity between 305 and 310 nm (ratio's denominator). As shown in FIG. 11, the resulting sensitivity to a temperature change of only 20° F. is approximately 2.4% and illustrates excellent linearity. Similarly, FIG. 12, illustrates a graph of temperature versus measured ratio for the same data and shows a prediction interval of ±30° F. and a confidence interval of only ±10° F. By comparing the measured ratios with independently established reference ratios correlating to specific temperatures, for example in a computer look-up table, the present embodiment provides an efficient and accurate means for optically monitoring flame temperature in a combustion cell.

ADDITIONAL ASPECTS

Fuel quality differs heavily in various parts of the world where combustor systems may be located. Accordingly, it is highly desirable to detect and determine which (if any) contaminants may exist in a particular environment, such as sodium (Na), sulfur (S), potassium (K), calcium (Ca), lead (Pb), and vanadium (V). These contaminants, if present, may burn and form reactants which disadvantageously coat the inside of the chamber (combustor) walls, in some cases clogging air flows which prohibit the system from running optimally. In accordance with the present embodiment, monitoring the combustion flame cell by the optical spectrophotometer of the present embodiment simultaneously enables the monitoring of potentially harmful contaminants burning in the combustion cells. For impurities identification, the spectral emission lines of these elements give off characteristic light having a known wavelength. This emission is mainly from electron energy level transitions which are determined by the atomic properties of the respective elements. These lines, when monitored with the spectrophotometer would potentially allow for a warning condition at which time, the fuel source would be cleaned appropriately.

In addition to temperature measurement, the optical spectro-photometer of the present embodiment may also be utilized to monitor the spectral emission of a taggant coating applied beneath the thermal barrier coatings (TBCs) on the inner walls of the combustion chamber prior to being introduced to service. One example of a suitable taggant material is europia doped yittria stabilized zirconia (YSZ: Eu). When the walls coated with such a taggant material erode and are exposed to heat, the taggant (YSZ:Eu) is exposed and fluoresces at around 610 nm. In this manner, the taggant acts as an odometer which gauges the effective life on the system.

The system and method of the present embodiment provide for enhanced optical combustion cell monitoring by enabling accurate measurement of the temperature of a gas combustion flame in real time thereby allowing optimization of turbine efficiency, reduction in pollution emissions, and a better estimation of turbine service life before requiring overhaul. Additionally, the presence of known impurities or taggant odometer coatings using the same real-time signal, could also be determined. All of these can be done in parallel, providing a wealth of real-time combustion cell data.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A combustion flame monitoring system, comprising:
   at least two photodetectors positioned for receiving light from a combustion flame, each of the at least two photodetectors having a different, overlapping bandwidth for detecting a respective output signal in an ultraviolet emission band; and
   a computer for calculating a ratio of integrated intensities for each of the different overlapping bandwidths, and using the ratio of integrated intensities to determine a temperature of the combustion flame temperature.

2. The combustion flam monitoring system of claim 1, wherein the ultraviolet emission band is the OH emission band.

3. A combustion flame monitoring system, comprising:
   a multiple element CCD-based spectrophotometer for receiving light from the combustion flame, wherein the multiple element CCD-based spectrophotometer operates to monitor an optical emission spectrum in at least first and second discrete bandwidth ranges and generates a first intensity signal representative of the flame intensity in the first bandwidth range and a second intensity signal representative of the flame intensity in the second bandwidth range; and
   a computer for
      integrating the first intensity signal to generate a first integrated intensity,
      integrating the second intensity signal to generate a second integrated intensity, and
      calculating a ratio of integrated intensities of the first and second integrated intensities, and
      using the ratio to determine a temperature of the combustion flame.

4. The system of claim 3 wherein the multiple element CCD-based spectrophotometer detects the output signal in an ultraviolet emission band.

5. The system of claim 3 wherein the multiple element CCD-based spectrophotometer detects the output signal in an OH emission band.

6. The system of claim 3 wherein the computer includes a look-up table for using the ratio to determine the combustion flame temperature.

7. The system of claim 3, wherein the first bandwidth range is between 305 and 310 nm and the second bandwidth range is between 310 and 340 nm.

8. The system of claim 7, wherein the ratio of integrated intensities may be expressed as:

$$\text{Ratio} = \frac{\int_{310}^{340} I(\lambda)d\lambda}{\int_{305}^{310} I(\lambda)d\lambda},$$

where $I(\lambda)$ represents the measured intensity for a wavelength $\lambda$.

9. The system of claim 3, wherein the multiple element CCD-based spectrophotometer operates to monitor an optical emission spectrum in at least one bandwidth associated with at least one impurity and generates an impurity signal indicative of the presence or absence of the at least one impurity.

10. The system of claim 9, wherein the at least one impurity includes sodium, sulfur, potassium, calcium, lead, and vanadium.

11. The system of claim 3, wherein the multiple element CCD-based spectrophotometer operates to monitor an optical emission spectrum in at least one bandwidth associated with fluorescence of an odometer taggant coating and generates a taggant fluorescence signal indicative of exposure of the odometer taggant coating to the combustion flame.

12. The system of claim 11, wherein the in at least one bandwidth is 610 nm and the odometer taggant coating comprises europia doped yittria stabilized zirconia (YSZ: Eu).

13. A method for combustion flame monitoring, comprising:
receiving light from a combustion flame by at least two photodetectors, each of the at least two photodetectors having a different, overlapping bandwidth for detecting a respective output signal in an ultraviolet emission band; and
calculating a ratio of integrated intensities for each of the different overlapping bandwidths, and using the ratio of integrated intensities to determine a temperature of the combustion flame temperature.

14. The method of claim 13, wherein the ultraviolet emission band is the OH emission band.

15. A method for combustion flame monitoring, comprising:
receiving light from a combustion flame by a multiple element CCD-based spectrophotometer;
monitoring an optical emission spectrum in at least first and second discrete bandwidth ranges and generates a first intensity signal representative of the flame intensity in the first bandwidth range and a second intensity signal representative of the flame intensity in the second bandwidth range;
integrating the first intensity signal to generate a first integrated intensity;
integrating the second intensity signal to generate a second integrated intensity;
calculating a ratio of integrated intensities of the first and second integrated intensities; and
using the ratio to determine a temperature of the combustion flame.

16. The method of claim 15 wherein monitoring an optical emission spectrum further includes detecting the output signal in an OH emission band.

17. The method of claim 15 wherein using the ratio to determine a temperature of the combustion flame further comprises using a computer look-up table for determining the combustion flame temperature.

18. The method of claim 15, wherein the first bandwidth range is between 305 and 310 nm and the second bandwidth range is between 310 and 340 nm.

19. The method of claim 18, wherein the ratio of integrated intensities may be expressed as:

$$\text{Ratio} = \frac{\int_{310}^{340} I(\lambda)d\lambda}{\int_{305}^{310} I(\lambda)d\lambda},$$

where $I(\lambda)$ represents the measured intensity for a wavelength $\lambda$.

20. The method of claim 15, wherein monitoring an optical emission spectrum further includes:
monitoring an optical emission spectrum in at least one bandwidth associated with at least one impurity; and
generating an impurity signal indicative of the presence or absence of the at least one impurity.

21. The method of claim 20, wherein the at least one impurity includes sodium, sulfur, potassium, calcium, lead, and vanadium.

22. The method of claim 15, further comprising:
monitoring, by the multiple element CCD-based spectrophotometer, an optical emission spectrum in at least one bandwidth associated with fluorescence of an odometer taggant coating; and
generating a taggant fluorescence signal indicative of exposure of the odometer taggant coating to the combustion flame.

23. The method of claim 22, wherein the in at least one bandwidth is 610 nm and the odometer taggant coating comprises europia doped yittria stabilized zirconia (YSZ: Eu).

24. A system for monitoring a combustion flame, comprising:
means for obtaining at least two output signals of the combustion flame in an OH emission band, each output signal having a different, overlapping bandwidth;
means for calculating a ratio of integrated intensities for each of the different overlapping bandwidths; and
means for using the ratio of integrated intensities to determine a temperature of the combustion flame temperature.

25. A flame temperature determining system, comprising:
a multiple element CCD-based spectrophotometer for simultaneously receiving light from at least two combustion flames, wherein the multiple element CCD-based spectrophotometer operates to monitor an optical emission spectrum in at least first and second discrete bandwidth ranges and generates a first intensity signal representative of the combined flame intensity in the first bandwidth range and a second intensity signal representative of the combined flame intensity in the second bandwidth range; and
a computer for
integrating the first intensity signal to generate a first integrated intensity,
integrating the second intensity signal to generate a second integrated intensity, and
calculating a ratio of integrated intensities of the first and second integrated intensities, and
using the ratio to determine a temperature of the combustion flame.

26. The system of claim 25, further comprising:
at least two optical fiber mounts positioned in relative proximity to each of the at least two combustion flames, the optical fiber mounts each including fiber optic elements for receiving light output by the combustion flames; and
an optical switch for receiving light from the fiber optic elements of the at least two optical fiber mounts and multiplexing the light together for transmission to the multiple element CCD-based spectrophotometer.

* * * * *